G. C. ANTHON.
Sewer Gas-Traps.
No. 141,412.          Patented August 5, 1873.
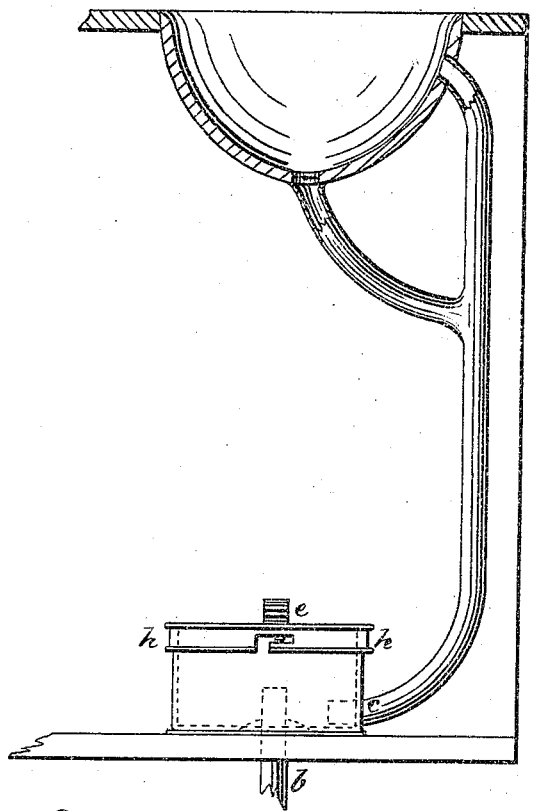
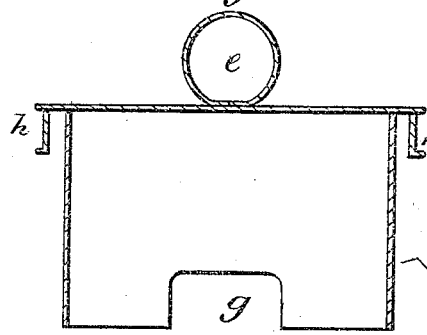
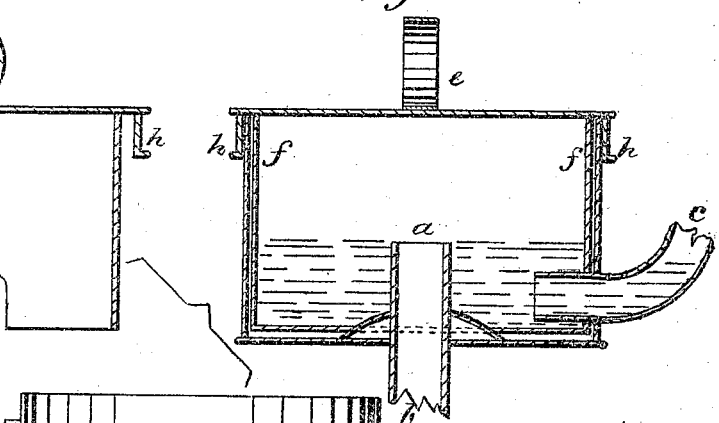
Witnesses:
Henry Anthon
Emily Anthon
Inventor:
Geo. C. Anthon

UNITED STATES PATENT OFFICE.

GEORGE C. ANTHON, OF NEW YORK, N. Y.

IMPROVEMENT IN SEWER-GAS TRAPS.

Specification forming part of Letters Patent No. 141,412, dated August 5, 1873; application filed June 14, 1873.

*To all whom it may concern:*

Be it known that I, GEORGE C. ANTHON, of the city, county, and State of New York, have invented a new and useful Sewer-Gas Trap, to be used in connection with wash-basins, bath-tubs, water-closets, &c.; and that the following, taken in connection with the drawings, is a full, clear, and exact description thereof.

In the drawings, Figure 1 is an elevation of the trap as applied to a wash-basin, shown in section. Fig. 2 is a vertical section through the top of the cover; and Fig. 3 is a vertical section at right angles to the former through the trap.

I have been led to the present invention by experience of the siphoning out of the ordinary U-trap, and by knowledge of the fact that this trap, even when provided with a trap-screw, can seldom be cleansed, when stopped up, without the aid of a plumber. All persons who have attentively considered the operation of the common trap will remember that at times a gurgling noise proceeds from it just after the last particles of water have disappeared from the basin, tub, or sink. This noise is caused by the trap emptying itself when the velocity through it is too great, and the trap is then said to siphon out. When it does so it no longer serves as a sewer-gas trap, and the sewer smell and gases enter the house.

My improved trap consists of a box, cylindrical or of other shape—cylindrical, by preference—and open at top. Into the bottom of this box the soil-pipe, or pipe leading to the sewer $b$, is introduced and extends up some distance above the bottom, as at $a$. Into the side of this box the waste-pipe $c$ from the basin, tub, or sink leads; and its open end inside the box must be at a lower level than the orifice or open end of the sewer-pipe. Either pipe or both may enter through the sides of the box, or either or both may enter through the bottom. I prefer the arrangement shown in the drawing.

This open box would not answer for a sewer-gas trap for two reasons: first, it would leave the open end of the sewer-pipe unclosed, so that the gas would enter the house; second, it would be liable to overflow in case the head was too great in the waste-pipe, or in case the sewer-pipe were partially closed.

I therefore fit upon the box a cover, $e$, made up of the cover proper $e$ and walls of a cylinder, $f\!f$, descending from it. This cylinder must be small enough to enter the box and extend so far down that it will enter the liquid, which will have its upper surface level with the top of the sewer-pipe. I prefer to make this cylinder extend nearly to the bottom of the box and cut a hole, $g$, in one part of it, so that the cylinder can straddle the waste-pipe $c$.

I prefer to make the cylinder or walls of the cover a close fit to the inner surface of the walls of the box or trap proper—a closer fit than is shown in the drawings, the only limit to its closeness being that the walls of the cover shall not stick fast to the sides of the trap, thus preventing easy removal of the cover.

I prefer, also, to attach an outside rim to the cover, as shown at $h\,h$, but this is not essential. I also prefer to attach to the cover a ring, or some means of lifting it, and to secure to the outside of the trap a pin, which will take into a groove in the outer rim of the cover. The cover is thus secured by a bayonet-joint to the trap.

A hook, pin, bolt, or other contrivance may be substituted for this fastening, or it may be dispensed with and the cover weighted or made so heavy that it will stay down.

It is clear, from inspection of the drawings, that no gases from the sewer-pipe can escape without passing down through the liquid in the trap and under the lower edge of the cylinder making part of the cover. Consequently they cannot escape at all. The only possibility of gas escaping will be at the joint of the cover with the top of the box, if it be loose, and all the gas that could escape in that way, even if the joint were open, would be that rising from the small annular surface of liquid bounded on one side by the walls of the box and on the other side by the exterior of the cylinder attached to and making part of the cover.

The bayonet-fastening will hold the cover down and permit its removal when necessary, and it is clear that all dirt can be removed from the box when the cover is taken off.

I claim as my invention—

A sewer-gas trap, composed of an open-topped box and a cover provided with a cylinder, as described, and having pipes for the entrance and exit of fluids, arranged substantially as set forth.

GEO. C. ANTHON.

In presence of—
  J. PROFFATT,
  WM. O. SHIPMAN.